(No Model.) 5 Sheets—Sheet 2.
E. C. ELLWOOD.
TWO ROW SEED SOWER.
No. 319,211. Patented June 2, 1885.
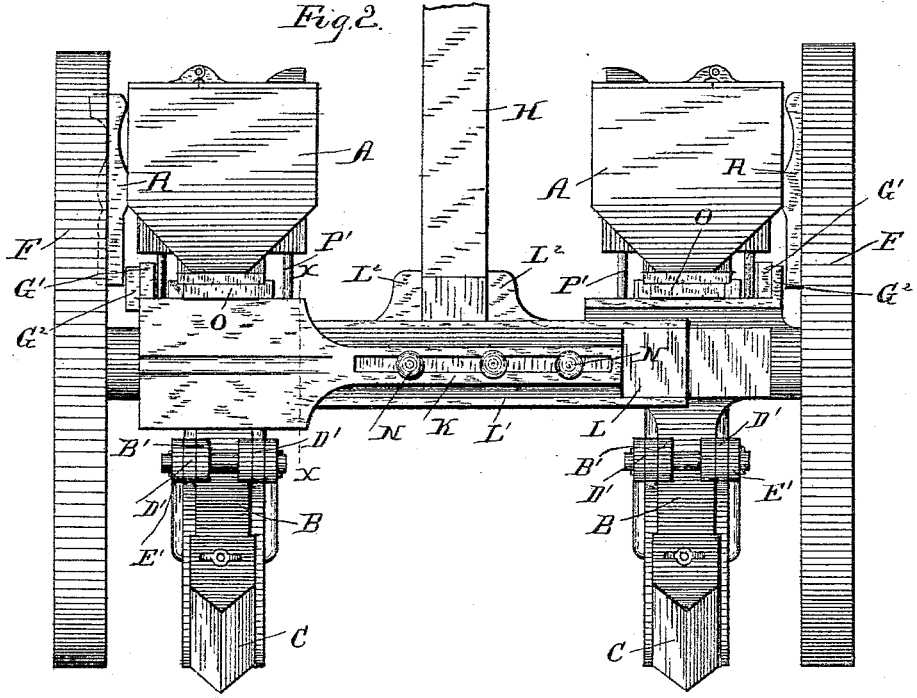
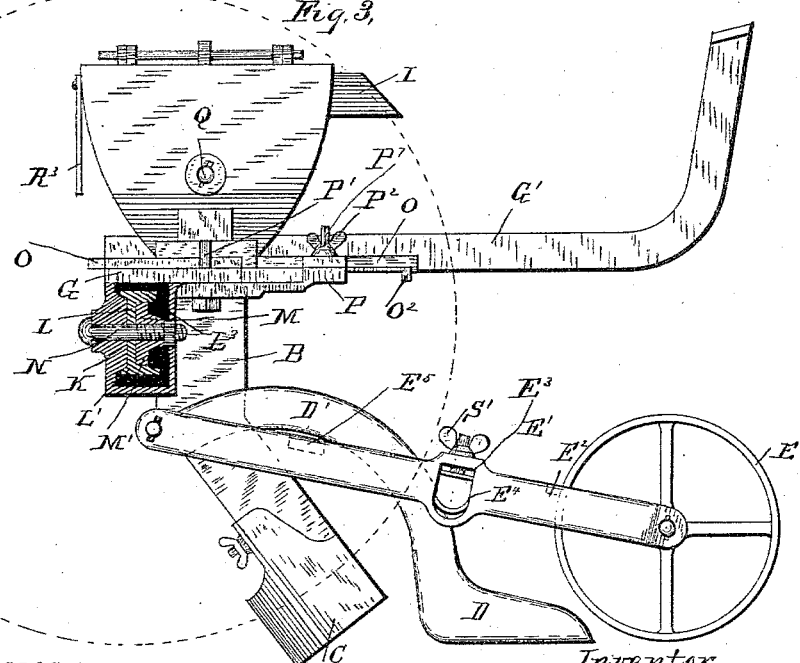
Witnesses
William A. Jones
J. T. Wooster
Inventor
Everett C. Ellwood
By A. M. Wooster
atty.

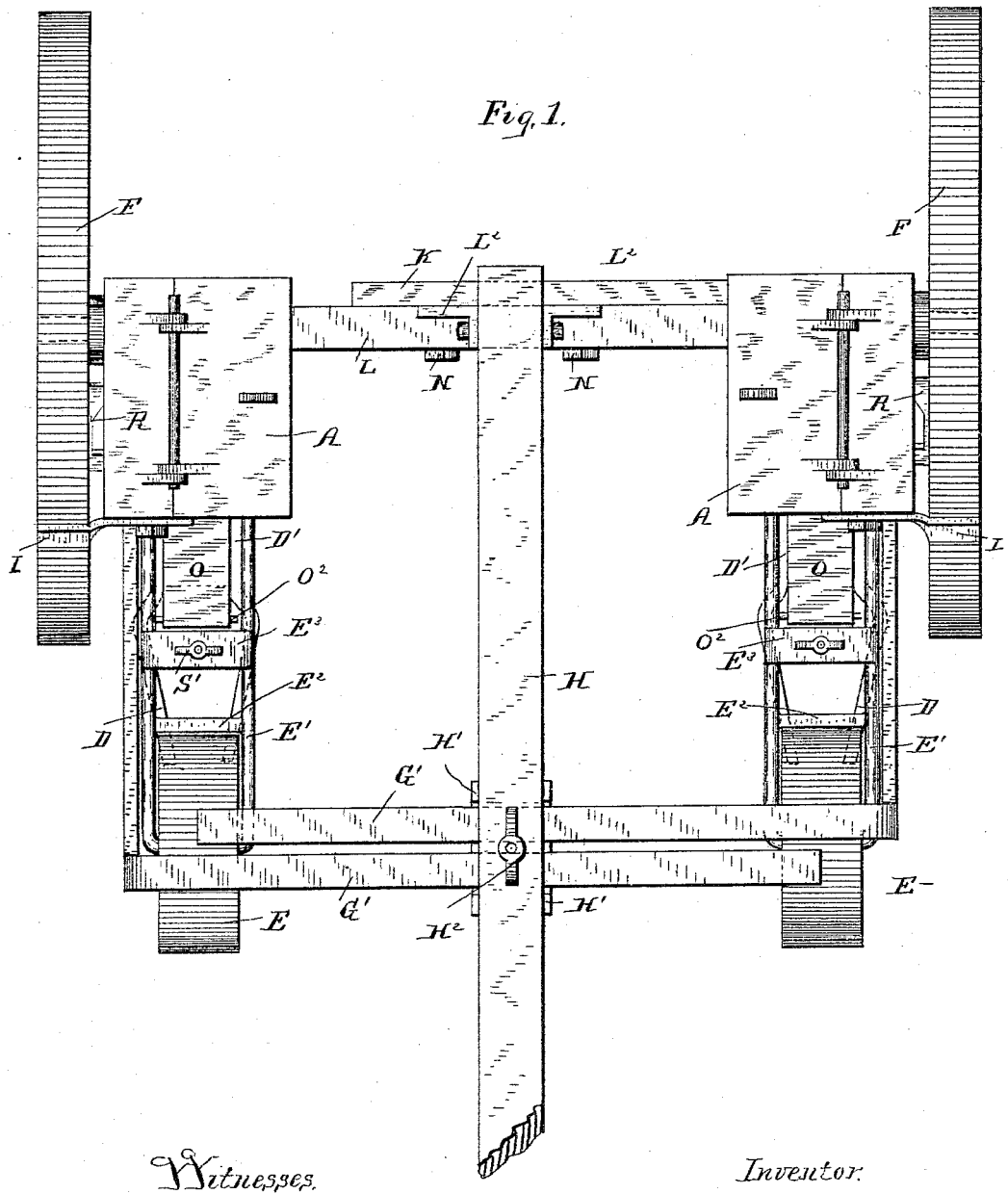

(No Model.) 5 Sheets—Sheet 3.
E. C. ELLWOOD.
TWO ROW SEED SOWER.

No. 319,211. Patented June 2, 1885.

Witnesses,
Wm H Jones
J. C. Wooster

Inventor:
Everett C. Ellwood
By A. M. Wooster
atty.

(No Model.) 5 Sheets—Sheet 4.
E. C. ELLWOOD.
TWO ROW SEED SOWER.
No. 319,211. Patented June 2, 1885.
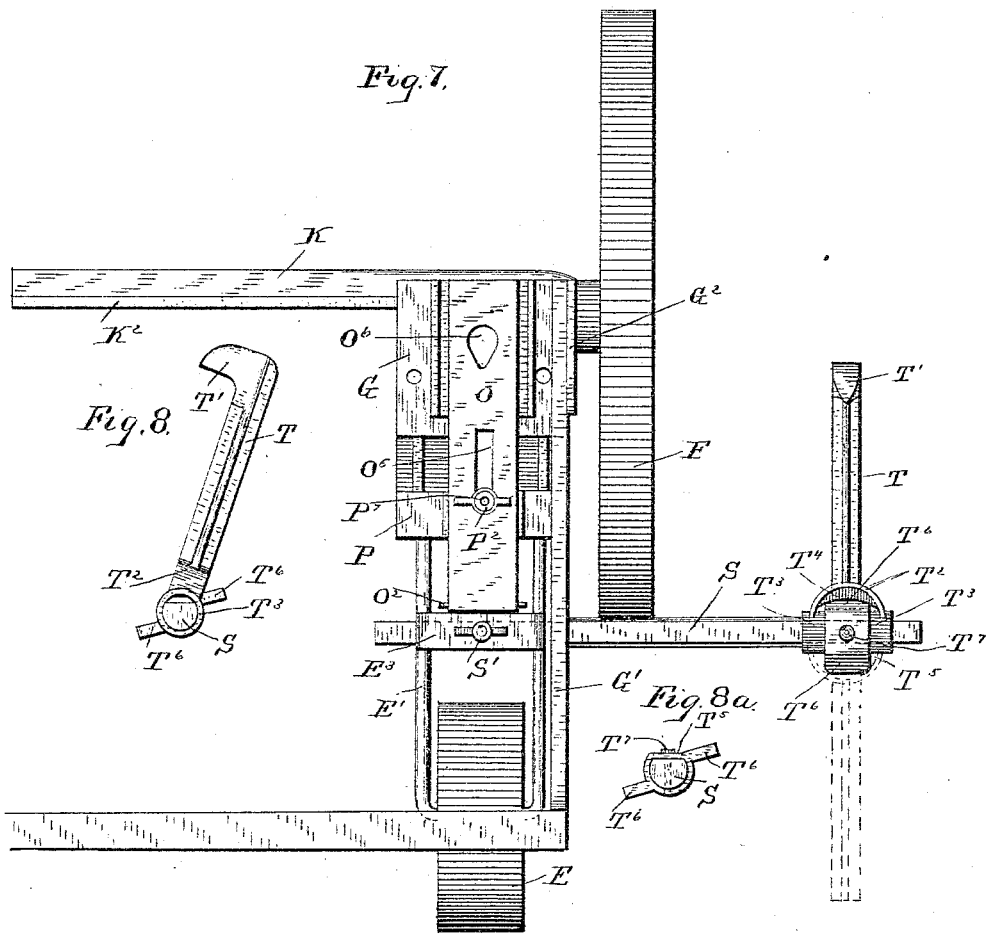
Witnesses
W. A. Jones,
J. T. Wooster
Inventor,
Everett C. Ellwood
By A. M. Wooster
Atty.

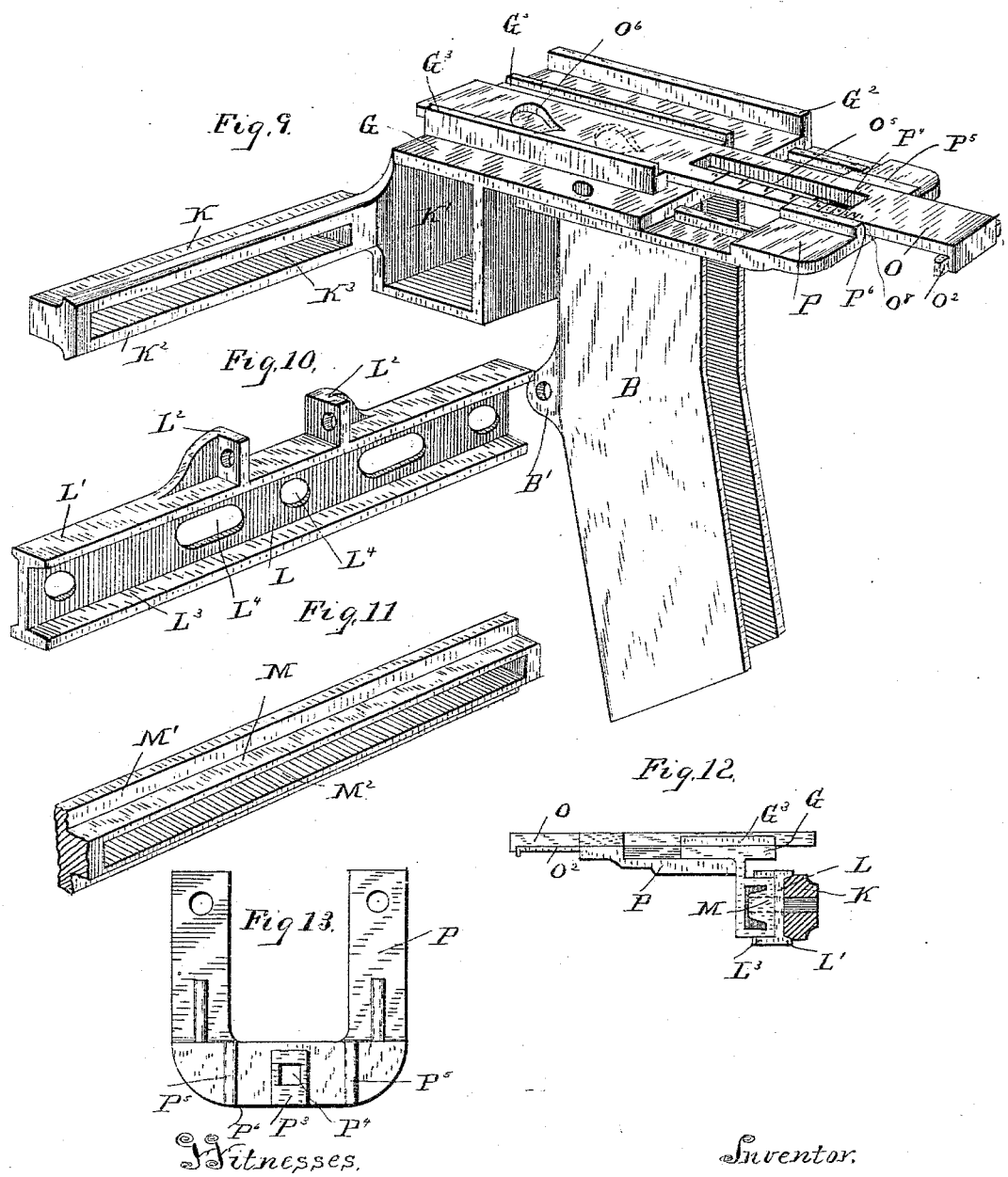

United States Patent Office.

EVERETT C. ELLWOOD, OF GREEN'S FARMS, CONNECTICUT.

TWO-ROW SEED-SOWER.

SPECIFICATION forming part of Letters Patent No. 319,211, dated June 2, 1885.

Application filed October 9, 1884. (No model.)

*To all whom it may concern:*

Be it known that I, EVERETT C. ELLWOOD, a citizen of the United States, residing at Green's Farms, in the county of Fairfield and State of Connecticut, have invented certain new and useful Improvements in Two-Row Seed-Sowers; and I do hereby declare the following to be a full, clear, and exact description of the invention, such as will enable others skilled in the art to which it appertains to make and use the same.

My invention has for its object to produce a seed-sower capable of sowing two rows of seed at the same time at any desired distance apart, which shall be simple in construction, economical in cost, effective, and durable in use, and practically impossible to get out of repair. With these ends in view I have devised the simple and novel construction which I will now describe, referring by letters to the accompanying drawings, forming part of this specification, in which—

Figure 4:
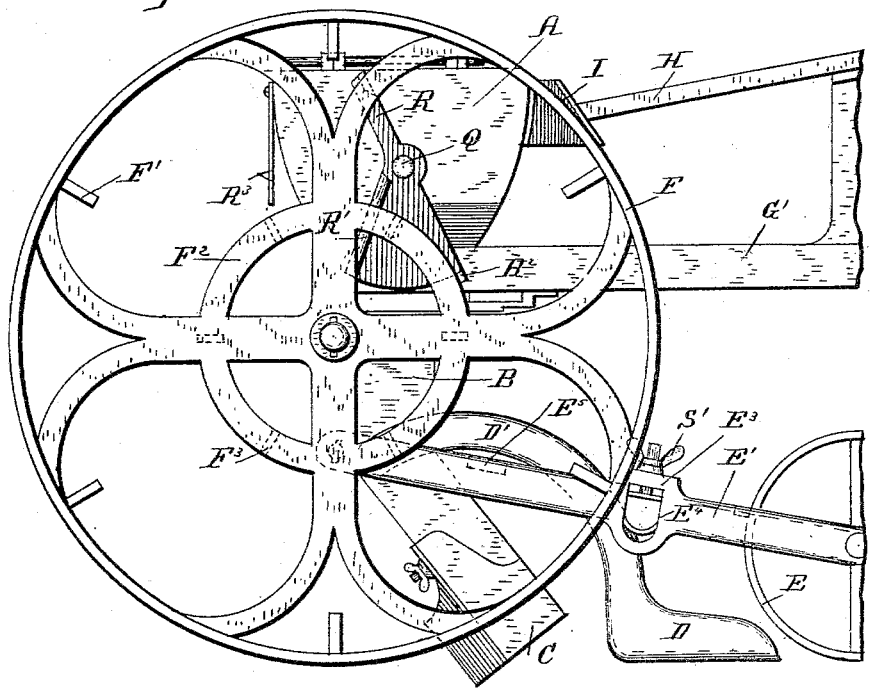
Figure 5:
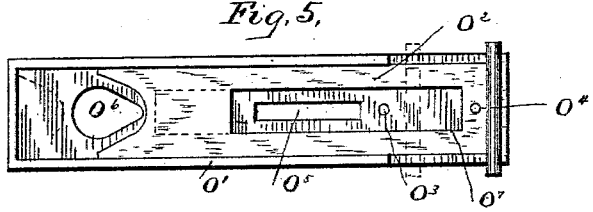
Figure 6:
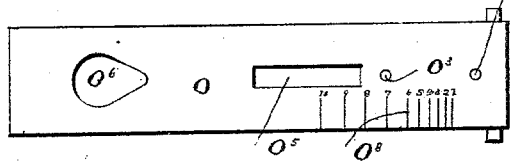

Figure 1 is a plan view of the machine complete; Fig. 2, a front elevation; Fig. 3, a cross-section on the line $x\ x$, Fig. 2, the slides being closed together, the hopper, conveyer, platform, &c., being in elevation; Fig. 4, a side elevation. Figs. 5 and 6 are respectively bottom and top views of the mechanism for controlling the flow of seed. Fig. 7 is a plan view of one half of the machine with the hopper removed, and also showing the marker. Figs. 8 and $8^a$ are details of the marker; Fig. 9, a perspective of one conveyer, the platform, and the feed-controlling mechanism, and also showing the front slide, which is cast integral with the pocket; Fig. 10, a perspective of the middle slide detached; Fig. 11, a perspective of the back slide broken from the platform; Fig. 12, an inner side elevation, on a reduced scale, of one of the platforms, the slides being drawn out and the front slide in section; and Fig. 13, a plan view of one of the platforms detached.

Similar letters indicate like parts in all the figures.

It will be seen that each half of the machine is complete in itself, each hopper being provided with independent agitating and seed-controlling mechanism, so that, if desired, two different kinds of seed can be sown at the same time in separate rows, the adjustment of each half of the machine being independent of the other half. For example, two different crops, or an early and late crop of the same kind, may be sown at the same time.

A represents the hoppers; B, the seed-conveyers; C, the shares bolted thereto, and D the coverers, which, with the side bars, E', of the frames that carry the presser-wheels E, are pivoted by a single bolt to ears B' upon the conveyers.

F indicates the main wheels; G' the handle-bar supports projecting backward from platforms G, which support handle-bar H. The platforms and conveyers are preferably cast together.

I represents scrapers attached to the hoppers, which act to clear away the soil which may adhere to the main wheels, thus preventing them from balling up in sticky soil, the effect of which would be to raise the machine, thus preventing the seed from being deposited at a uniform depth. The independent mechanism—that is to say, the two separate drills—are connected together by three connecting slides or bars which slide upon each other.

K represents the front cross-slide, which, with the pocket K', is cast integral with one of the platforms.

In my drawings I have shown the front cross-slide and the pocket as cast solid with the left platform, viewed from the front of the machine. This, however, is a matter within the judgment of the constructer. The back edge of this front cross-slide is provided with beveled flanges $K^2$, which are so formed as to slide freely within flanges L' upon the middle cross-slide. Upon the top of the middle cross-slide are lugs $L^2$, to which the handle-bar is bolted.

M is the back cross-slide, which is cast in the present construction integral with the right platform, as viewed from the front. The front of this slide is provided with flanges M', which are so formed as to slide freely within the back flanges, $L^3$, upon the middle cross-slide. The front and back cross-slides are both slotted longitudinally, as at $K^3\ M^2$, for the passage of the securing-bolts N, which pass through holes or slots $L^4$ in the middle cross-slide, so that when the securing-bolts are loosened the front and back slides may be adjusted upon the middle slide. By this construction I am enabled to adjust the two machines at any desired distance apart and without excessive length of the slides. When the machines are adjusted at their farthest distance apart, the inner ends of the front and back slides just pass each other sufficient distance to permit of each being firmly secured to the middle slide. The front and back slides are made wide in cross-section—that is, in the direction of the strain—in order to secure the maximum of lightness and strength. As stated above, the platforms G are cast integral with the front and back slides, one of said platforms having a pocket, K', cast therewith. When the machines are adjusted close together, the ends of the middle and back slides pass into this pocket, the construction of which is such as to brace and strengthen this portion of the machine.

$G^3$ represents raised strips or guides, which are cast integral with the platform longitudinally thereto. These strips or guides serve as supports for the bases of the hoppers, and also as ways for the seed-slides O.

P is a plate, which forms an extension to the platform, and is rigidly secured thereto by long bolts P' passing down through the hoppers and through the platforms and plates P. This plate serves as a support for the rear end of the said slide, being provided with guides $P^5$, which hold it against lateral movement, and with a boss, $P^3$, for a purpose presently to be explained.

Upon the under side of the seed-slides at their outer edges and forward ends are raised ribs O', upon which the slide rides. Underneath this slide and between the side ribs I place the cut-off $O^2$. This cut-off has only two positions relatively to the seed-opening—that is, it leaves the opening either wholly opened or closed. The ribs O' serve as guides for the cut-off, and being slightly higher than the thickness of the cut-off the latter is left free to be moved in or out independently of the seed-slide. Each of the slides is provided with a seed-opening, $P^4$, which may be of any suitable shape. I preferably, however, use a pear-shaped opening, as shown in the bottom of the hopper, and a similarly-shaped opening reversed in the seed-slide. By means of these slides I adjust the size of the openings through which the seed passes from the hoppers to the conveyers to suit the kind of seed or the amount which it is desired to sow.

$O^8$ is a gage marked upon the seed-slide, using the corner $P^6$ of one of the guides $P^5$ as a gage-point. The names of the different kinds of seeds may be printed upon the slides, or numbers may be printed thereon, as shown, and the names of the various kinds of seeds to which the machine is adapted and the corresponding numbers may be printed on an accompanying card. The cut-off is provided with a long slot, $O^7$, through which boss $P^3$ upon plate P projects. The seed-slide is clamped to this boss by means of a bolt, $P^7$, which passes through the square opening $P^4$ in boss $P^3$ and through slot $O^5$ in the seed-slide, and is secured by a thumb-nut, $P^2$, which thus holds the seed-slide in any desired position, but leaves the cut-off free to slide under it. The latter is held at either its opened or closed positions by a pin, (not shown,) which passes through holes $O^3$ in the slide and into a pole, $O^4$, in the cut-off. The flow of seed may thus be instantly stopped or started without disturbing the adjustment of the seed-slide.

In Fig. 9 the seed-slide is shown as at its extreme forward position.

Fig. 5 shows the open position of the cut-off in full lines, and the closed position in dotted lines. Q represents shafts, which pass through the hoppers and are journaled in the opposite sides thereof. These shafts carry the agitating mechanism, which may consist of one or more radial arms or nests of bristles, as may be found most desirable. It is of course essential that the seed be prevented from clogging in the seed-opening, which is more likely to occur with certain classes of seed than others. Outside of the hoppers on the ends of the shafts next to the wheels I attach levers R, which are so constructed and adjusted that their opposite ends are alternately struck by two series of lugs upon the main wheels, thus keeping the lever and shaft Q continually in vibration. One set of these lugs, F', I preferably place upon the inner side of the rims of the wheels, and the other set, $F^3$, upon a ring, $F^2$, about midway between the centers of the wheels and the rims, the two sets alternating in position. In use the vibrating lever is just struck by one of the lugs upon the rim and is carried forward thereby until the lug passes the lever. At this instant the opposite end of the vibrating lever is caught by one of the inner set of lugs and carried in the opposite direction until the lug passes the lever, at which instant the opposite end of the lever is struck again by one of the outer set of lugs as before. Each vibration of lever R of course imparts a like positive motion to shaft Q and to the radial arms or bristles which act as the agitator, which are thus kept constantly in motion. The vibrating lever R may be of any suitable construction—I preferably, however, adopt substantially the construction illustrated in Fig. 4. The lever is pivoted to shaft Q about midway of its length, the lower end being made sufficiently heavy to act as a counterpoise, thus returning it to its normal position without the use of springs.

R' is a flange, which is engaged by the inner set of lugs, which act to carry the lever forward until the lug passes under the flange. At the extreme lower end of the vibrating lever is a lug, $R^2$, which is adapted to engage a hole (not shown) in a spring-catch, $R^3$, which is secured to the side of the hopper. When lug $R^2$ is in engagement with this catch, the lever is held in substantially a horizontal position, flange R' being uppermost. In this position neither set of lugs upon the wheel come in contact with any portion of the lever, thus disconnecting the agitating mechanism, as when the machine is being moved, but it is not desired to sow seed. The main wheels F are journaled at the outer ends of the front and back cross-slides, K and M. I have shown the conveyers B as cast integral with the platforms and front and back slides, (see Fig. 9,) but, if preferred, the conveyers may be cast separately and secured to the platforms by bolts or in any suitable manner. The shares are of any ordinary construction, and are secured in the usual manner to the conductors. As stated above, the side bars, E', of the frames, which carry the presser-rollers E, are pivoted to ears upon the front of the conveyers.

E² are cross-pieces at the rear of the frames, which act as scrapers for the presser-wheels.

E³ is a cross-piece directly over the guide-holes E⁴, in which the marker-bar S slides. This cross-piece is provided with a threaded hole, through which thumb-screw S' passes, which holds the marker-bar in its proper position. The front cross-piece, E⁵, (see Fig. 3,) is placed close enough to the conveyer, so that when the handle is raised this cross-piece will rest upon the conveyer, thus preventing the frames and rollers from dropping down. The shanks D' of the coverers are curved upward and pass over this cross piece, which thus acts additionally to prevent the coverers from dropping down. For example, when the handle is lifted up the coverers rest upon the cross-piece, which in turn rests on the conveyer, so that both coverers and presser-wheels may be lifted free from the ground. The marker consists of an arm, T, which I preferably provide with a tooth, T'. At the inner end of the arm is an arched cross-piece, T², connected at its opposite ends to rings T³, which turn freely on the marker-bar.

T⁴ is a web across the under side of the arched cross-piece. Between the rings T³, I place a band, T⁵, having projecting lugs T⁶. The shape of this band and its lugs are clearly shown in Fig. 8ª. The essential feature is that the band is made the same shape as the marker-bar, so as not to turn thereon. When it is not desired to use the marker, it is turned forward out of the way, as shown in full lines in Fig. 7. The web then rests on the upper lug. The position of the marker when in use is shown in dotted lines in this figure. When in use, the web does not rest on the lower lug, but slightly above it. When the handle-bar is raised, the web will rest against the lower lug, which acts to keep the marker from dropping down in the way. The band may be prevented from sliding on the marker-bar by a pin, T⁷, passing through both, or in any suitable manner. The propelling power is applied to the machine through the handle-bar H. The handle-bar supports G' are wrought-iron bars, which are attached to flanges G² upon the platforms and extend backward, are then bent upward and then across under the handle-bar, passing through a clamp, H', having a screw, H², by which the supports are held rigidly at any desired position. By this means I brace and greatly strengthen the machine and apply the propelling power to the independent machines near the points of greatest resistance—*i. e.*, the wheels and seed-conductors. I thus secure the maximum of lightness and strength in these parts, the handle-bar being firmly supported and rigidly connected with the independent machines, so that the entire rear portions of both machines may be lifted free from the ground by raising the handle-bar. By loosening thumb-screw H² in the clamp and the bolts in the cross-slides which connect the two hoppers the independent machines may be placed at any desired adjustment relatively to each other. By tightening up the bolts and screw the machines are held in position when adjusted and kept parallel with each other.

I do not limit myself to the exact construction shown, as it is obvious that the details may be varied within reasonable limits without departing from the spirit of my invention.

I claim—

1. In a two-row seed-sower, the middle cross-slide to which the handle-bar is attached, in combination with two outer cross-slides adapted to move thereon, by which the operative parts of two independent machines are carried.

2. The middle cross-slide and the handle-bar secured thereto, in combination with front and back cross-slides, each of which carries a hopper and seed-conveyer, and to each of which one of the main wheels is journaled.

3. In a seed-sower, the middle cross-slide having flanges L' L³, and central openings, L⁴, in combination with the front and back cross-slides, both of which have flanges adapted to slide within the flanges L' L³, and longitudinal slots and bolts N, which secure the slides in place when adjusted.

4. In a seed-sower, the front cross-slide having pocket K' and a platform, P, cast integral therewith, in combination with the middle cross-slide, the back cross-slide having the other platform cast integral therewith, and bolts which hold the cross-slides at any desired adjustment.

5. In a seed-sower, the middle cross-slide and the front and back cross-slides, each having a platform and a seed-conveyer cast integral therewith, in combination with plates P and the hoppers, said platforms, plates, and hoppers being secured together by bolts P', passing down through the hopper.

6. The combination, with the hoppers, conveyers, and platforms, of the seed-slides having ribs O' upon their under sides, the cut-offs adapted to slide within said ribs, and means, as pins and bolts, for holding the parts when adjusted, whereby the flow of seed may be regulated or entirely cut off without disturbing the adjustment of the regulating-slide.

7. The platforms having guides G³, and the conveyers cast integral therewith, and plate P, bolted to the platform, in combination with a seed-slide adapted to work within the guides and having ribs upon its under side, between which a cut-off slides, said ribs projecting slightly beyond the cut-off, so that when the seed-slide is tightened up the cut-off is still free to slide.

8. The main wheels having two sets of lugs alternating in position, in combination with levers at the ends of the agitator-shafts, the ends of which are adapted to be struck alternately by the two sets of lugs, whereby motion is imparted to the agitator-shaft, for the purpose set forth.

9. The main wheels having a set of lugs on the inner side of the rims, and another set upon a ring placed about midway between the rims and the hubs, and alternating in position with the former set, in combination with levers upon the agitator-shafts, the ends of which are adapted to be struck alternately by the two sets of lugs, whereby positive vibratory motion is imparted to the agitator-shaft.

10. The double-armed agitator-lever having a counterpoise, flange R' upon one side of the lower half, and lug R², in combination with a main wheel having two sets of lugs which alternately strike the upper end of the lever and the flange when the lever is in operative position, and a catch, R³, adapted to engage lug R² to hold the lever out of operative position.

11. The handle-bar supports secured to the platforms and extending backward, then across under the handle, in combination with clamp H' and thumb-screw H², whereby the parts are firmly held in place.

12. The middle cross-slide to which the handle-bar is secured, and the front and back cross-slides, each carrying a main wheel, hopper, seed-conveyer, &c., in combination with the handle-bar supports, the clamp, and means, as bolts and set-screw, for holding the parts in place, whereby the two rows may be sown at any desired distance apart.

13. The markers having rings at their inner ends which turn freely on the marker-bar, in combination with a band adapted to slide but not to turn upon the marker-bar, and provided with lugs which act as stops to hold the marker when out of operative position and to prevent its dropping down when the machine is lifted.

14. The marker having at its inner ends two rings connected by an arched cross-piece having a web, T⁴, in combination with a band, T⁵, between said rings, which is permitted to slide but not to turn on the bar, and is provided with lugs T⁶, which act as supports for the marker.

15. The marker-bars adapted to slide in guides in the presser-wheel side-bars and held by a thumb-screw, S', in combination with the markers adapted to turn on said bars, and lugs T⁷, which support the marker when out of operative position and when the machine is lifted.

16. The platforms having guides G³ and plates P, having guides P⁵ and bosses P⁸, in combination with the seed-slides having slots O⁵ and the cut-offs having slots O⁷, adapted to engage said bosses.

17. The hoppers, conveyers, platforms, and plates P, having guides P⁵ and index-points P⁶, in combination with the seed-slides having gages O⁸.

In testimony whereof I affix my signature in presence of two witnesses.

EVERETT C. ELLWOOD.

Witnesses:
A. M. WOOSTER,
A. B. FAIRCHILD.